US012396056B2

(12) United States Patent
Wang et al.

(10) Patent No.: US 12,396,056 B2
(45) Date of Patent: Aug. 19, 2025

(54) METHODS AND APPARATUS OF SIDELINK RELAY BASED DATA COMMUNICATION (71) Applicant: MediaTek Singapore Pte. Ltd., Singapore (SG)

(72) Inventors: Xuelong Wang, Beijing (CN); Nathan Edward Tenny, Beijing, CA (US); Chia-Chun Hsu, Hsinchu (TW); Chun-Fan Tsai, Hsinchu (TW); Guan-Yu Lin, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 249 days.

(21) Appl. No.: 18/056,672

(22) Filed: Nov. 17, 2022

(65) Prior Publication Data

US 2023/0084017 A1   Mar. 16, 2023

Related U.S. Application Data (63) Continuation of application No. PCT/CN2021/095144, filed on May 21, 2021, which
(Continued)

(30) Foreign Application Priority Data

May 21, 2020  (WO) ................ PCT/CN2020/091597
May 21, 2021  (WO) ................ PCT/CN2021/095144

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0229* (2013.01); *H04W 76/14* (2018.02); *H04W 76/27* (2018.02); *H04W 88/04* (2013.01)

(58) Field of Classification Search
CPC ............... H04L 5/0048; H04L 5/0051; H04W 72/0453; H04W 72/0446; H04B 1/44; H04B 1/40; Y02D 30/70; H03K 17/28
See application file for complete search history.

(56) References Cited

U.S. PATENT DOCUMENTS

2012/0207069 A1*  8/2012  Xu ................... H04W 52/0222
                                                              370/311
2017/0149546 A1*  5/2017  Zhang ................. H04W 72/542
(Continued)

FOREIGN PATENT DOCUMENTS

CN   109479189 A   7/2016
CN   110249706 A   2/2017
(Continued)

OTHER PUBLICATIONS

"Further consideration on the paging of remote UE", 3GPP TSG RAN WG2 #98, Hangzhou, China, May 15-19, 2017 (R2-1704638) (Year: 2017).*
(Continued)

*Primary Examiner* — Sun Jong Kim
(74) *Attorney, Agent, or Firm* — Helen Mao; Imperium Patent Works (57) ABSTRACT

Apparatus and methods are provided for sidelink relay-based UE-to-network communication. The disclosure describes the relay UE performing delayed relay forwarding upon determining the remote UE is in the DRX cycle based on the PC5 configuration. The relay UE buffers the relay traffic and/or sends a suspending indication to the base station to request the base station to suspend the relay traffic to the remote UE. The disclosure describes the relay UE monitoring paging occasions configured for itself and receives paging message from the network intended for the remote UE in one non-connected RRC state. The relay UE sends a PC5 paging message to the remote UE that is in the
(Continued)

non-connected RRC state through the established SL based on the received paging message. The disclosure describes the network storing the SL association between the relay UE and the remote UE to the network.

9 Claims, 8 Drawing Sheets

Related U.S. Application Data is a continuation of application No. PCT/CN2020/091597, filed on May 21, 2020.

(51) Int. Cl.
*H04W 76/14* (2018.01)
*H04W 76/27* (2018.01)
*H04W 88/04* (2009.01)

(56) References Cited

U.S. PATENT DOCUMENTS

| | | | | |
|---|---|---|---|---|
| 2018/0317163 | A1* | 11/2018 | Lee | H04W 48/18 |
| 2019/0230723 | A1* | 7/2019 | Kim | H04W 76/12 |
| 2019/0373493 | A1* | 12/2019 | Uchiyama | H04L 49/90 |
| 2020/0091991 | A1 | 3/2020 | Fujishiro et al. | H04B 7/155 |
| 2022/0225272 | A1* | 7/2022 | Yang | H04W 68/02 |
| 2022/0256587 | A1* | 8/2022 | Fujishiro | H04W 76/27 |

FOREIGN PATENT DOCUMENTS

| | | |
|---|---|---|
| CN | 110178441 A | 1/2018 |
| CN | 110692279 A | 5/2018 |

OTHER PUBLICATIONS

International Search Report and Written Opinion of International Search Authority for PCT/CN2021/095144 dated Jul. 25, 2021 (10 pages).
MediaTek Inc. RRC Status for Relaying 3GPP TSG-RAN WG2 Meeting #111 electronic Online R2-2006571 Aug. 28, 2020 sections 2-3.
European Intellectual Property Office Action 21808752.2-1215, dated Mar. 5, 2024 (12 pages).
Huawei et al: "Some Considerations About DRX On PC5"; 3GPP Draft; R2-1704718 Some Considerations About DRX On PC5, $3^{rd}$ Generation Partnership Project (3GPP).
Study On Further Enhancements To LTE Deviceto Device (D2D). (XP051668624); ZTE: "Further Consideration On the Paging Ofremote UE".

\* cited by examiner

METHODS AND APPARATUS OF SIDELINK RELAY BASED DATA COMMUNICATION

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/095144, titled "Methods and Apparatus of Sidelink Relay Based Data Communication," with an international filing date of May 21, 2021. International Application PCT/CN2021/095144, in turn, claims priority under 35 U.S.C. § 120 and § 365(c) from PCT/CN2020/091597, titled "Methods and Apparatus of Sidelink Relay Based Data Communication," with an international filing date of May 21, 2020. This application is a continuation of International Application No. PCT/CN2021/095144. International Application No. PCT/CN2021/095144 is pending as of the filing date of this application, and the United States is an elected state in International Application No. PCT/CN2021/095144. The disclosure of each of the foregoing documents is incorporated herein by reference.

TECHNICAL FIELD

The disclosed embodiments relate generally to wireless communication, and, more particularly, to sidelink relay based data communication.

BACKGROUND 5G radio access technology will be a key component of the modern access network. It will address high traffic growth and increasing demand for high-bandwidth connectivity. In 3GPP New Radio (NR), sidelink continues evolving. With new functionalities supported, the sidelink (SL) offers low latency, high reliability and high throughout for device-to-device communications. NR vehicle to everything (V2X) supports sidelink measurement. The V2X sidelink communication can be supported by unicast, groupcast, and broadcast. Using sidelink for wireless relay provides a reliable and efficient way for traffic forwarding. The sidelink relay evolves from the ProSe UE-to-Network relay at Layer-3 (L3) to UE-to-Network relay at layer-2 (L2), which is expected to forward the traffic between the remote UE and the base station at an adaptation layer between radio link control (RLC) layer and the packet data convergency protocol (PDCP) layer. For UE-to-Network relay operation, an important issue is to consider the relaying operation when the relay UE works at different RRC states. Different procedures are required to establish the connection between the remote UE and the base Station to enable relaying operation at the relay UE.

Improvements and enhancements are required for sidelink relay operation considering different RRC state of the relay UE and the remote UE.

SUMMARY

Apparatus and methods are provided for sidelink relay-based UE-to-network communication when the remote UE enters non-connected or DRX state. In one novel aspect, the relay UE performs delayed relay forwarding upon determining the remote UE is in the DRX cycle based on the PC5 configuration. In one embodiment, the delayed relay forwarding is buffering the relay traffic at the relay UE. In another embodiment, the delayed relay forwarding is sending a suspending indication to the base station to request the base station to suspend the relay traffic to the remote UE. The relay traffic is data traffic or a signaling message from the base station to the remote UE.

In another novel aspect, the relay UE monitors paging occasions configured for itself and receives paging message from the network intended for the remote UE in one non-connected RRC state. The relay UE sends a PC5 paging message to the remote UE that is in the non-connected RRC state through the established SL based on the received paging message. In one embodiment, the relay UE reports the SL association between the relay UE and the remote UE upon transitioning from an RRC_CONNECTED state to one non-connected RRC state. In another embodiment, paging message includes one or more elements comprising an ID of the relay UE, an ID of the remote UE, and an SL association between the relay UE and the remote UE. In another embodiment, an RRC Reconfiguration message with the remote UE ID and/or the remote UE-relay UE SL association is received from the gNB. In yet another embodiment, the paging message received by the relay UE indicates a paging to the remote UE or a wake-up indication to the remote UE and is forwarded to the remote UE through the sidelink. The remote UE initiates a RRC Resume Request or RRC Setup Request upon receiving the paging indication or the wake-up indication.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
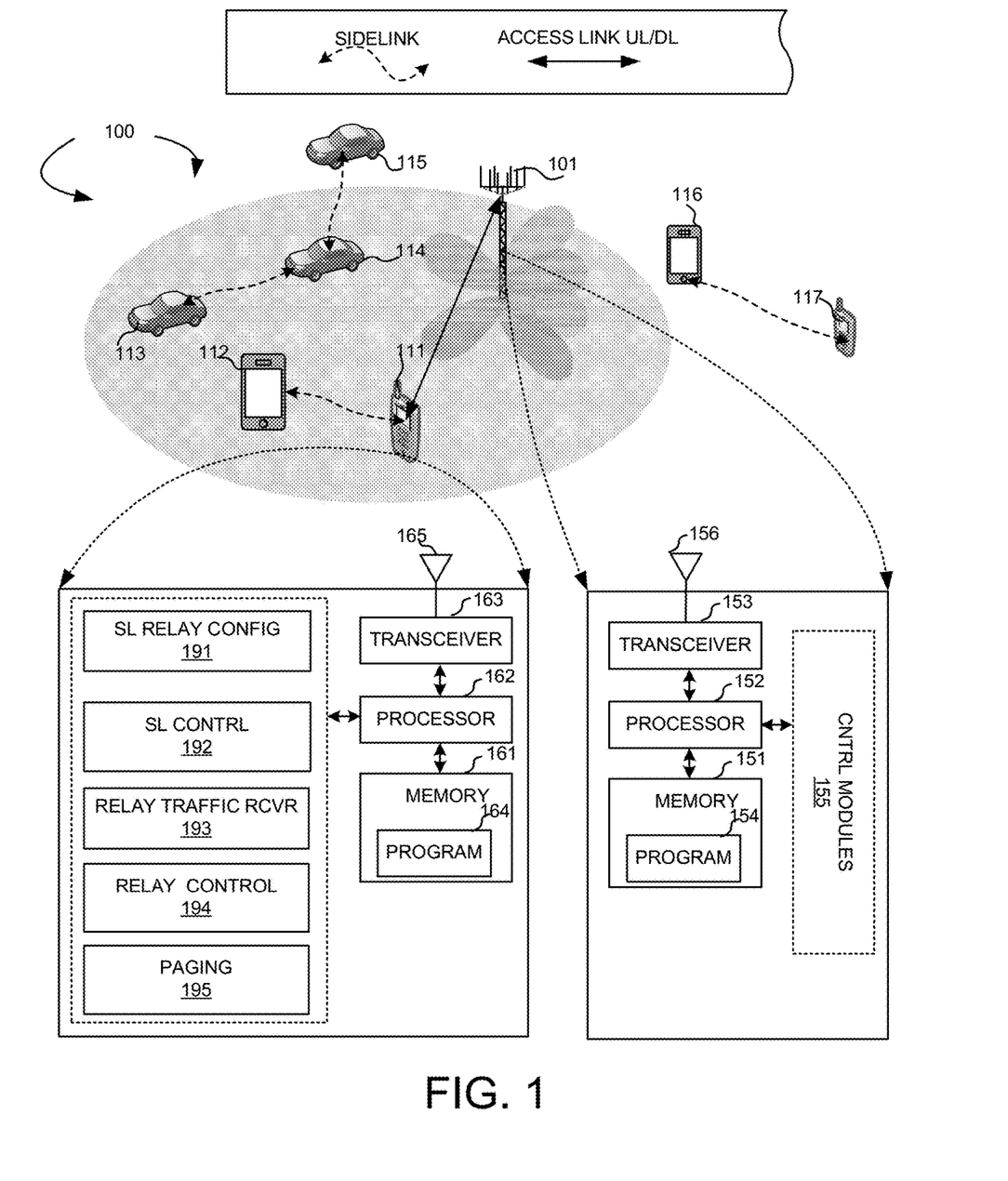
FIG. 1 is a schematic system diagram illustrating an exemplary wireless network for sidelink relay-based data communication in accordance with embodiments of the current invention.

FIG. 1 is a schematic system diagram illustrating an exemplary wireless network for sidelink relay-based data communication in accordance with embodiments of the current invention. Wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be a homogeneous network or heterogeneous network, which can be deployed with the same frequency or different frequency. gNB 101 is an exemplary base station in the NR network.

Wireless network 100 also includes multiple communication devices or mobile stations, such as user equipments (UEs) 111, 112, 113, 114, 115, 116, and 117. The exemplary mobile devices in wireless network 100 have sidelink capabilities. The mobile devices can establish one or more connections with one or more base stations, such as gNB 101. UE 111 has an access link, with uplink (UL) and downlink (DL), with gNB 101. UE 112, which is also served by gNB 101, may also establish UL and DL with gNB 101. UE 111 also establishes a sidelink with UE 112. Both UE 111 and UE 112 are in-coverage devices. Mobile devices on vehicles, such as mobile devices 113, 114, and 115, also have sidelink capabilities. Mobile device 113 and mobile device 114 are covered by gNB 101. Mobile device 113, an in-coverage device, establishes sidelink with mobile device 114, which is also an in-coverage device. Mobile device 115 on a vehicle, however, is an out-of-coverage device. In-coverage mobile device 114 establishes a sidelink with the out-of-coverage device 115. In other embodiments, the mobile devices, such as UE 116 and 117, may both be out-of-coverage but can transmit and receive data packets with another one or more other mobile stations with sidelink connections.

FIG. 1 further illustrates simplified block diagrams of a base station and a mobile device/UE for the sidelink slot configuration and resource allocation. gNB 101 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 101. Memory 151 stores program instructions and data 154 to control the operations of gNB 101. gNB 101 also includes a set of control modules 155 that carry out functional tasks to communicate with mobile stations.

UE 111 has an antenna 165, which transmits and receives radio signals. An RF transceiver circuit 163, coupled with the antenna, receives RF signals from antenna 165, converts them to baseband signals, and sends them to processor 162.

In one embodiment, the RF transceiver may comprise two RF modules (not shown). A first RF module is used for HF transmitting and receiving, and the other RF module is used for different frequency bands transmitting and receiving, which is different from the HF transceiver. RF transceiver 163 also converts received baseband signals from processor 162, converts them to RF signals, and sends out to antenna 165. Processor 162 processes the received baseband signals and invokes different functional modules to perform features in the UE 111. Memory 161 stores program instructions and data 164 to control the operations of the UE 111. Antenna 165 sends uplink transmission and receives downlink transmissions to/from antenna 156 of gNB 101.

The UE also includes a set of control modules that carry out functional tasks. These control modules can be implemented by circuits, software, firmware, or a combination of them. A sidelink (SL) relay configuration module 191 configures a relay path between a remote UE and a base station, wherein the UE is connected with the base station through a Uu link in the wireless network. A sidelink controller 192 establishes an SL with the remote UE, wherein the SL is part of the relay path, and wherein a discontinuous reception (DRX) cycle is configured for the remote UE over the SL. A relay traffic receiver 193 receives relay traffic from the base station destined to the remote UE. A relay controller 194 performs delayed relay forwarding upon determining the remote UE is in the DRX cycle configured over the SL. A paging module 195 receives, from the wireless network, a paging message for the remote UE on a paging occasion (PO) configured for the relay UE, wherein the remote UE is in a non-connected RRC state comprising an RRC_IDLE state and an RRC_INACTIVE state, and wherein the paging message is based on an SL association between the UE and the remote UE and sends a PC5 paging message to the remote UE that is in the non-connected RRC state through the established SL based on the received paging message.

Figure 2:
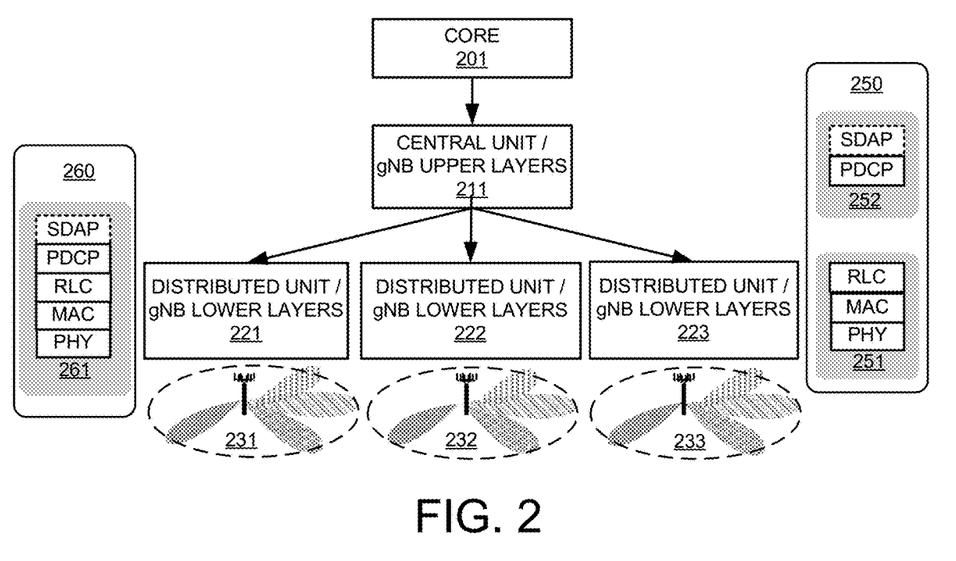
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A Core unit 201 is connected with one central unit 211 with gNB upper layer 252. In one embodiment 250, gNB upper layer 252 includes the PDCP layer and optionally the SDAP layer. Central unit 211 is connected with distributed units 221, 222, and 221. Distributed units 221, 222, and 223 each correspond to a cell 231, 232, and 233, respectively. The DUs, such as 221, 222 and 223 include gNB lower layers 251. In one embodiment, gNB lower layers 251 include the PHY, MAC and the RLC layers. In another embodiment 260, each gNB has the protocol stacks 261, including SDAP, PDCP, RLC, MAC and PHY layers.

Figure 3:
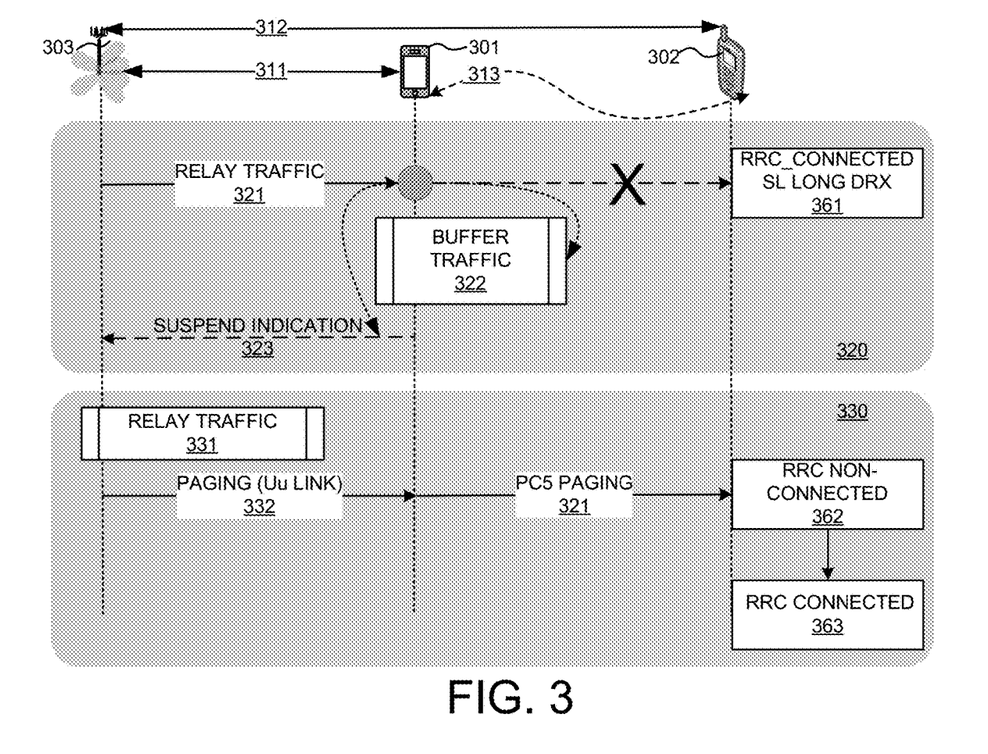
FIG. 3 illustrates an exemplary top-level functional diagram for the sidelink relay-based communication in accordance with embodiments of the current invention.

FIG. 3 illustrates an exemplary top-level functional diagram for the sidelink relay-based communication in accordance with embodiments of the current invention. Relay UE 301 and remote UE 302 are connected with gNB 303 in the NR network through Uu links 311 and 312, respectively. In one embodiment, a sidelink 313 is configured between relay UE 301 and remote UE 302. Remote UE 302 should be reachable by network while the UE-to-Network relay is reachable by the network and the remote UE is reachable by the UE-to-Network relay. In general, the remote UE is only reachable via the relay UE if a unicast PC5 link, such as sidelink 313, is established between the remote UE and the relay UE.

In one novel aspect, illustrated in procedure 320, the relay UE performs delayed relay forwarding upon determining the remote UE entering the discontinuous reception (DRX) mode over the sidelink 313. As an exemplary relay path is established with Uu link 311 and relay link 313, relay UE forwards relay traffic between gNB 303 and remote UE 302. The relay traffic includes data traffic and signaling messages. The PC5 status of the remote UE 302 is not visible to gNB 303. For example, with regard to PC5 link, sidelink 313, when there is no traffic ongoing, the PC5 link is kept without traffic, which is identical to inactive status. In some scenarios, the Uu RRC state between remote UE 302 and gNB 303 is maintained without the consideration of the status of the PC5 link between remote UE 302 and relay UE 301. Specific to the remote UE 302 in RRC connected state from Uu RRC perspective, enters into long DRX mode 361 from perspective of PC5. There may be desynchronization between Uu and PC5 for remote UE 302 when relay UE 301 itself is in RRC connected state and the network wants to communicate with the associated remote UEs. At step 321, gNB 303 sends relay traffic destined to remote UE 302 to relay UE 301. Relay UE 301 determines that remote UE 302 is in DRX cycle configured over the SL. In one novel aspect, relay UE 301 performs delayed relay forwarding upon determining the remote UE is in the DRX cycle configured over the SL. In one embodiment, at step 322, relay UE 301 buffers the relay traffic. In another embodiment 323, relay UE 301 sends a suspending indication to the base station 303 to request the base station to suspend the relay traffic to the remote UE 302. Relay UE 301 performs delayed relay forwarding by performs either step 322, or 323, or both 322 and 323.

In another novel aspect, as illustrated in exemplary procedure 330, relay UE 301 forward paging messages from the network to the remote UE 302, which is in one non-connected RRC state 362 and wakes up the remote UE. The non-connected RRC states including RRC_IDLE state and RRC_INACTIVE state. At step 331, gNB 303 prepares to transmit relay traffic to remote UE 302. At step 332, gNB 303 sends relay UE 301 a paging message for remote UE 302 in a non-connected RRC state. The paging message is based on an SL association between the relay UE and the remote UE. Relay UE 301, at step 321, forward the paging message through PC5 sidelink 313 to the remote UE 302. Remote UE 302 moves to RRC_CONNECTED state 363 based on the PC5 paging message.

Figure 4:
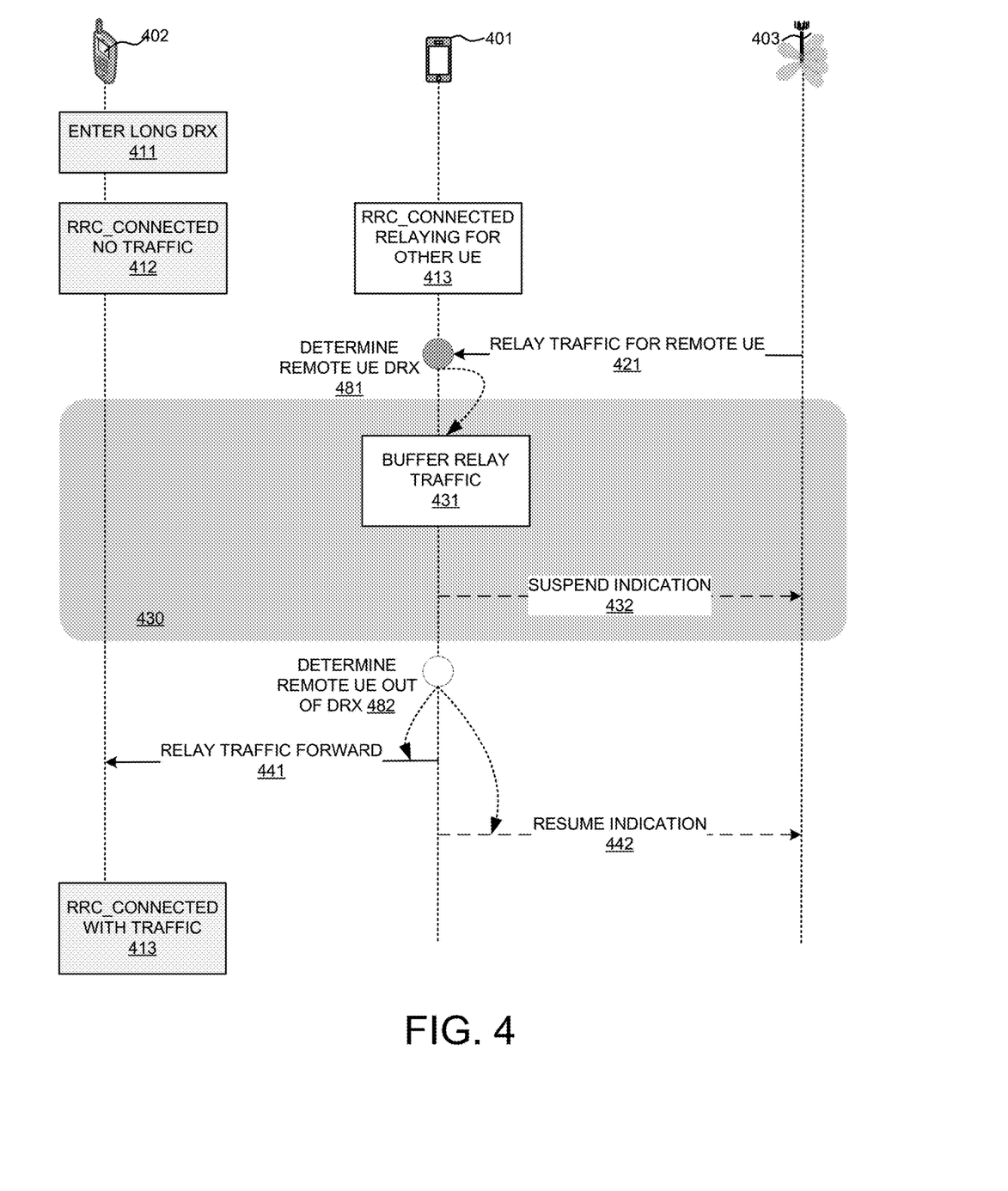
FIG. 4 illustrates an exemplary signaling procedure for downlink data transmission through relay UE between remote UE in the long DRX state and base station in accordance with embodiments of the current invention.

FIG. 4 illustrates an exemplary signaling procedure for downlink data transmission through relay UE between remote UE in the long DRX state and base station in accordance with embodiments of the current invention. Relay UE 401 is in RRC-Connected state 413 with an active Uu link with the gNB/base station 403. Remote UE 402 is, at step 412, in RRC connected state with no active traffic over the sidelink. At step 411, remote UE 402 enters long DRX mode over the sidelink to sleep according to configured long DRX cycle. The state of remote UE 402 is an inactive status during RRC connected state. The network keeps the UE context of remote UE. Base station/gNB 403 does not know the inactive status of remote UE 402.

At step 421, gNB 403 initiates downlink data transmission to the remote UE 402 via relay UE 401. Since remote UE 402 is in long DRX mode over the sidelink, relay UE 401 cannot deliver the data to the remote UE 402. In one novel aspect 430, relay UE 401 performs delayed relay forwarding upon determining the remote UE 402 is in the DRX cycle configured over the SL. In one embodiment, at step 431, relay UE 401 stores the downlink data in the buffer. It is assumed that relay UE 401 knows when the remote UE 402 will wake up according to the configured long DRX cycle. In one embodiment, the configured long DRX cycle is MAC parameter, which is configured via PC5 RRC message during the establishment of the PC5 relaying link. The configured long DRX cycle can be provided by gNB. Alternatively, it is decided by the relay UE. In any case, relay UE 401 knows the DRX cycle of one or more remote UE it established sidelink with.

In one embodiment, relay UE 401 sends periodical or event-based report of its buffer status, for example, for downlink relaying purpose, to the gNB 403. The buffer status enables gNB 403, and/or other network entities to determine whether to schedule the downlink data transmissions to relay UE 401 for the relay traffic to remote UE 402 to avoid the buffer overflow within the relay UE 401. In one embodiment, at step 432, relay UE 401 sends data suspension request to the network entity, such as gNB 403, to suspend the data transmission to remote UE 402 in order to wait for remote UE 402 to wake up, which is subject to the DRX cycle entered. In one embodiment, the network reduces the relay traffic through relay UE 401 to remote UE 402. In one embodiment, relay UE 401 determines if the relay traffic coming from the network is manageable. If the relay traffic is manageable, relay UE 401 buffers the traffic without sending the suspend request to the network.

At step 482, relay UE 401 determines that the remote UE 402 exiting the DRX cycle. At step 441, relay UE 401 delivers the buffered data to the remote UE 402 via PC5. At step 442, relay UE 401 requests the network to resume the downlink data transmission. At step 413, remote UE 402 comes back to normal RRC connected state again. In one embodiment, the relay UE 402 indicates the time for data suspension according to the configured DRX cycle of remote UE 402. The downlink data transmission is automatically resumed by the network after the expiration of the timer set following the time indicated from relay UE 401. Step 442 can be omitted. In yet another embodiment, relay UE 401 reports the DRX cycle of the remote UE 402 to the gNB 403. gNB 403 sends the downlink data to the remote UE 402 via relay UE 401 in a designated time pattern to avoid the data buffer for relaying at the relay UE 401.

In one novel aspect, the relay UE receives paging message from the network destined to the remote UE that is in the non-connected state and forwards the paging message to the remote UE using the sidelink. When the remote UE is inactive to the network, i.e., RRC_INACTIVE/RRC_IDLE from the perspective of indirect path with the network, its PC5 connection with UE-to-Network relay may be kept. Such PC5 connection may carry the forwarded paging message from UE-to-Network relay to remote UE. When the UE-to-Network relay is RRC_CONNECTED, the remote UE seen as RRC_INACTIVE/RRC_IDLE by the network would force the gNB to use paging to reach the remote UE. A likely scenario for sidelink relay operation is that the relay UE has multiple associations with a number of remote UEs. For example, the head node of car platooning (relay UE) serves one of his member cars, and some other member cars are communicating with the network with relaying supported by the head node. However, the other member cars have no traffic during this stage and may stays at RRC_INACTIVE/RRC_IDLE. During this period, the network can only reach these remote UEs by paging. The relay UE needs to monitor paging occasions for the remote UE while in RRC_CONNECTED. This puts a lot of burden for relay UE, since it in turn would require the UE-to-Network relay to monitor Paging Occasion(s) for multiple remote UEs, which would either cause undue complexity on the UE-to-Network Relay or otherwise impair the reachability of the Remote UE itself. In one embodiment, the network sends the paging message destined to the remote UE to the relay UE using the PO of the relay UE.

Figure 5:
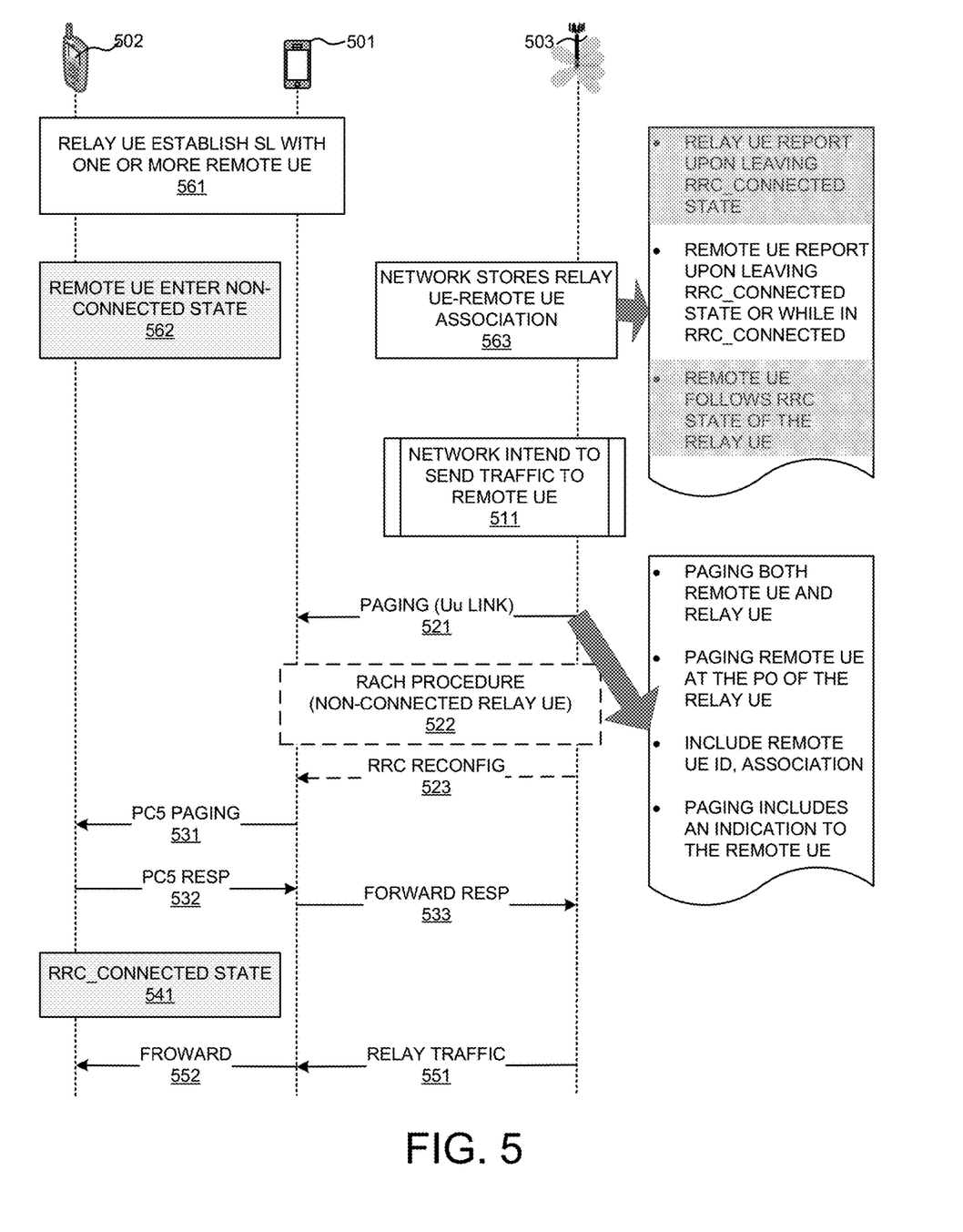
FIG. 5 illustrates exemplary diagrams of the relay UE forwarding paging messages from the network to the remote UE that is in one non-connected RRC state to wake up the remote UE in accordance with embodiments of the current invention.

FIG. 5 illustrates exemplary diagrams of the relay UE forwarding paging messages from the network to the remote UE that is in one non-connected RRC state to wake up the remote UE in accordance with embodiments of the current invention. Relay UE 501 established Uu link with gNB 503. At step 561, relay UE 501 establishes one or more SLs with one or more remote UEs, including a sidelink with remote UE 502. The SL with remote UE 502 is part of the relay path. At step 562, remote UE 502 enters one non-connected RRC state. The non-connected RRC state includes the RRC_INACTIVE state and the RRC_IDLE state. When the UE-to-Network relay is RRC_CONNECTED, the remote UE seen as RRC_INACTIVE/RRC_IDLE by the network would force the gNB to use paging to reach the remote UE.

At step 563, one or more network entities, such as gNB 503, stores the relay UE-remote UE SL association information. There is no PC5 RRC state on the PC5 link. Following this principle, the UE may present different states for Uu and PC5. For example, when the remote UE stays or goes to RRC_INACTIVE state or RRC_IDLE state from Uu interface perspective, the UE is still active at PC5 link as long as the PC5 link between remote UE and relay UE is kept. The network (gNB and/or core network) needs to store the remote UE-relay UE SL association when there is unicast PC5 link between these remote UE and relay UE. The network, based on the stored remote UE-relay UE SL association information, always pages the relay UE to find the associated one or more remote UEs. The relay UE only needs to monitor the paging occasions for itself and forwards the paging message to the associated remote UE.

There are different ways for the network/gNB to obtain the relay UE-remote UE SL association information. In one embodiment, the network is informed by relay UE 401 on the PC5 SL association between the relay UE and remote UE during the RRC connected stage or when the relay UE decides to leave the connected state. In one embodiment, the relay UE reports a list of remote UE that keeps PC5 link with relay UE to gNB during state transition (e.g., when going to RRC_INACTIVE state). In another embodiment, the relay UE dynamically updates the list of remote UE(s) that keeps PC5 link with relay UE to gNB in RRC_CONNECTED state.

In another embodiment, each remote UE associated with the relay UE informs the network (e.g., 5GC, 5G Core Network) during the RRC connected stage or when the remote UE decides to leave the connected state.

In yet another embodiment, each remote UE follows the RRC state of the relay UE, i.e., if the relay UE stays at RRC_CONNECTED, all the associated remote UEs follows the same Uu RRC state. When the relay UE goes to RRC_INACTIVE/RRC_IDLE, all remote UEs transfer to the same RRC state as the relay UE. The relay UE cannot go to non-connected states, including RRC_INACTIVE/RRC_IDLE, if any remote UE has active traffic flows, which requires the relay UE to stay in RRC_CONNECTED. In one embodiment, to reduce the power consumption for non-active remote UE, a large long DRX cycle is configured. Remote UE is assumed to remain in RRC_CONNECTED state with long DRX cycle, while the UE-to-Network Relay UE itself is RRC_CONNECTED.

Once the network obtains the remote UE-relay UE SL association, the network can page the non-connected remote UE by sending paging messages to the associated relay UE. At step 511, the network, such as gNB 503, prepares to send traffic to remote UE 502 based on the stored information of the remote UE-relay UE SL association.

At step 521, gNB 503 sends a paging message to relay UE 501 through the Uu link between relay UE 501 and gNB 503. In one embodiment, relay UE 501 is also in the non-connected RRC state. Paging message from gNB 503 initiates a RACH procedure 522 from relay UE 501 first. In one embodiment, the paging message from gNB 503 pages both relay UE 501 and remote UE 502. The paging message includes one or more elements comprising an identification (ID) of the relay UE, an ID of the remote UE, and an SL association between the relay UE and the remote UE. In one embodiment, the paging message is sent at the PO configured for relay UE 501.

In yet another embodiment, the paging message includes a paging indication or wake up indication to remote UE 502. Relay UE 501, upon receives the paging message, forward the paging indication or wake up indication to remote UE 502 through the PC5 sidelink. Remote UE 502, upon receiving the paging indication or the wake-up indication, initiates a RRC Resume Request or RRC Setup Request to the network, using the PC5 RRC message through relay UE 501. Relay UE 501 forwards the RRC Resume Request or RRC Setup Request to the network/gNB 503. The network proceeds with RRC procedures such that remote UE 502 transfers back to RRC_CONNECTED state 541.

In one embodiment, at step 523, the gNB 503 sends RRC Reconfiguration message to relay UE 502 following the paging message. In one embodiment, the RRC Reconfiguration message includes the remote UE ID and/or the remote UE-relay UE SL association. At step 531, relay UE 501 forward the PC5 paging message to remote UE 502 through the sidelink. At step 532, remote UE 502 sends PC5 RRC response message to relay UE 501. At step 533, relay UE 501 forwards the RRC response message from remote UE 501 to gNB 503. At step 541, remote UE 502 enters RRC_CONNECTED state. At step 551, gNB 503 sends relay traffic for remote UE 502 to relay UE 501. At step 552, relay UE 501 forwards the relay traffic to remote UE 502.

Figure 6A:
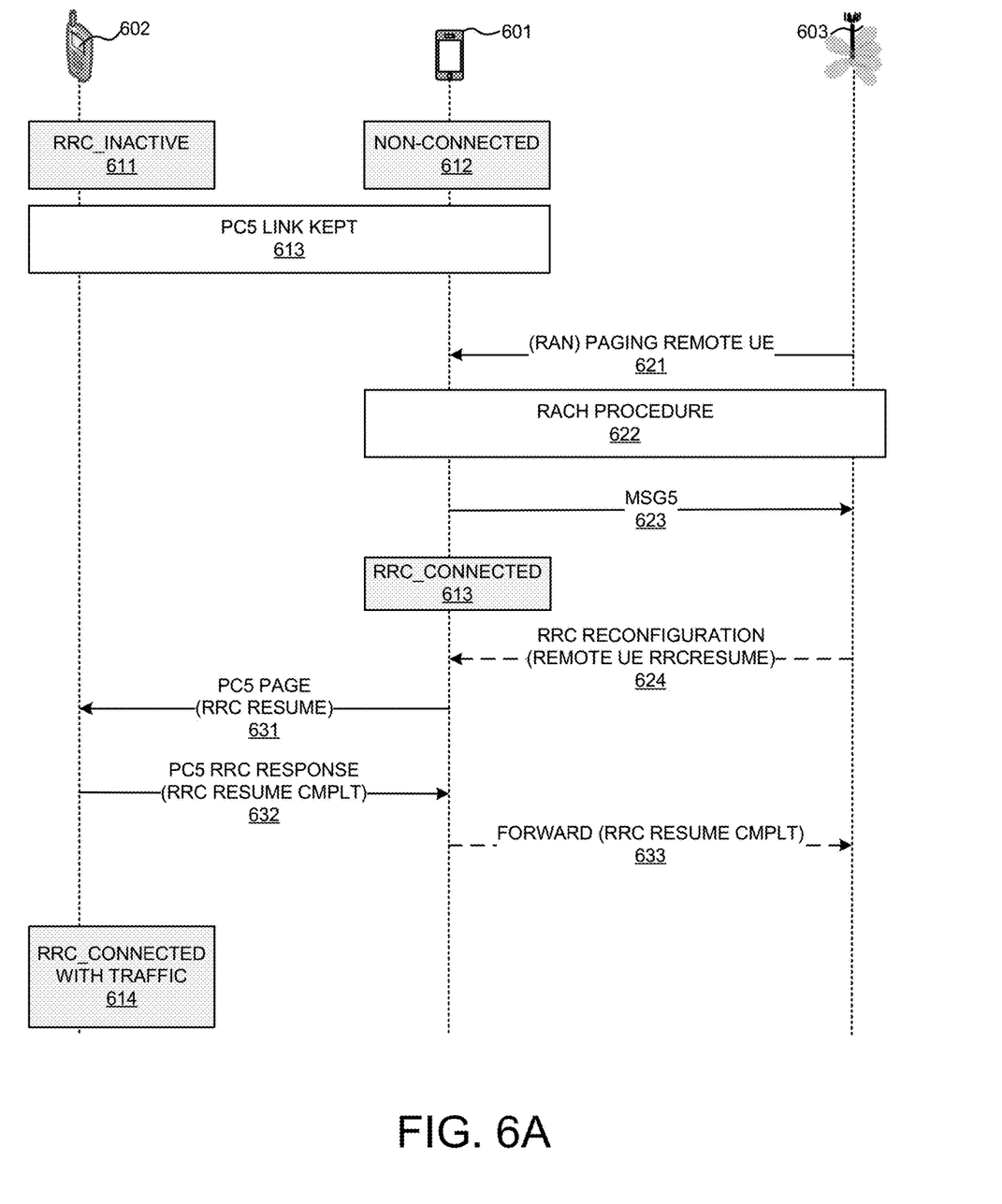
FIG. 6A illustrates an exemplary flow diagram of the relay UE forwarding paging messages from the network to the remote UE that is in RRC_INACTIVE state to wake up the remote UE in accordance with embodiments of the current invention.

FIG. 6A illustrates an exemplary flow diagram of the relay UE forwarding paging messages from the network to the remote UE that is in RRC_INACTIVE state to wake up the remote UE in accordance with embodiments of the current invention. Relay UE 601, in non-connected RRC state 612, establishes a sidelink (SL) with remote UE 602, which is in RRC_INACTIVE mode 611. Relay UE 601 is connected with a gNB/base station 603 through a Uu link in the wireless network. Remote UE 602 and relay UE 601 keeps the PC5 sidelink at 613. At step 621, gNB 603 initiates the paging message to the relay UE 601 with the intention to wake up both relay UE 601 and remote UE 602 for downlink data transmission to the remote UE 602. If relay UE 601 is in RRC_INACTIVE state, gNB 603 sends paging message to wake up both remote UE 602 and relay UE 601. If relay UE 601 is in RRC_IDLE state, gNB 603 sends paging message to wake up both remote UE 602 and relay UE 601. In one embodiment, the remote UE index or identity is included in the paging message to allow relay UE 601 to identify which remote UE is the termination point for the downlink data transmission. In another embodiment, gNB 603 sends the remote UE index or identity in a dedicated RRC message to identify which remote UE is the termination point for the downlink data transmission.

At step 622, relay UE 601 performs RACH procedure towards gNB 603 as a response to the paging message from gNB 603. At step 623, message-5 is sent from relay UE 601 to gNB 603 to establish a RRC connection with the gNB 603. At step 613, relay UE 601 enters RRC_CONNECTED state. In one embodiment, at step 624, gNB 603 sends a RRC Reconfiguration message to the remote UE with RRCResume. At step 631, relay UE 601 forwards a PC5 paging message to remote UE 602 based on paging message at step 621 and optionally RRCReconfiguration message at step 624. In one embodiment, PC5 paging message includes RRCResume. At step 632, remote UE 602 responds PC5 RRC with an encapsulated Uu RRCResumeComplete message towards gNB 603. At step 633, the relay UE 601 forwards the encapsulated Uu RRCResumeComplete message towards gNB 603 over Uu. At step 614, remote UE 602 goes to RRC_CONNECTED state with traffic.

In one embodiment, relay UE 601 and remote UE 602 performs a handshake upon receiving the paging message at step 621. Upon successful handshake indicating that the remote UE is responsive, remote UE 602 initiates a RRC Resume Request message through the sidelink to relay UE 601. Relay UE 601 forwards the RRC Resume Request message through the Uu interface to gNB 603. In another embodiment, if the relay UE goes to RRC_INACTIVE, and the associated remote UE goes also to RRC_INACTIVE, gNB uses RAN based paging to wake up relay UE before paging the remote UE for downlink data transmission. gNB knows the SL association between the relay UE and remote UE when they are both in RRC_INACTIVE. The SL association between the relay UE and remote UE when they are both in RRC_INACTIVE is stored by gNB. This SL association can be added into the UE context stored in gNB for UE in RRC_INACTIVE.

Figure 6B:
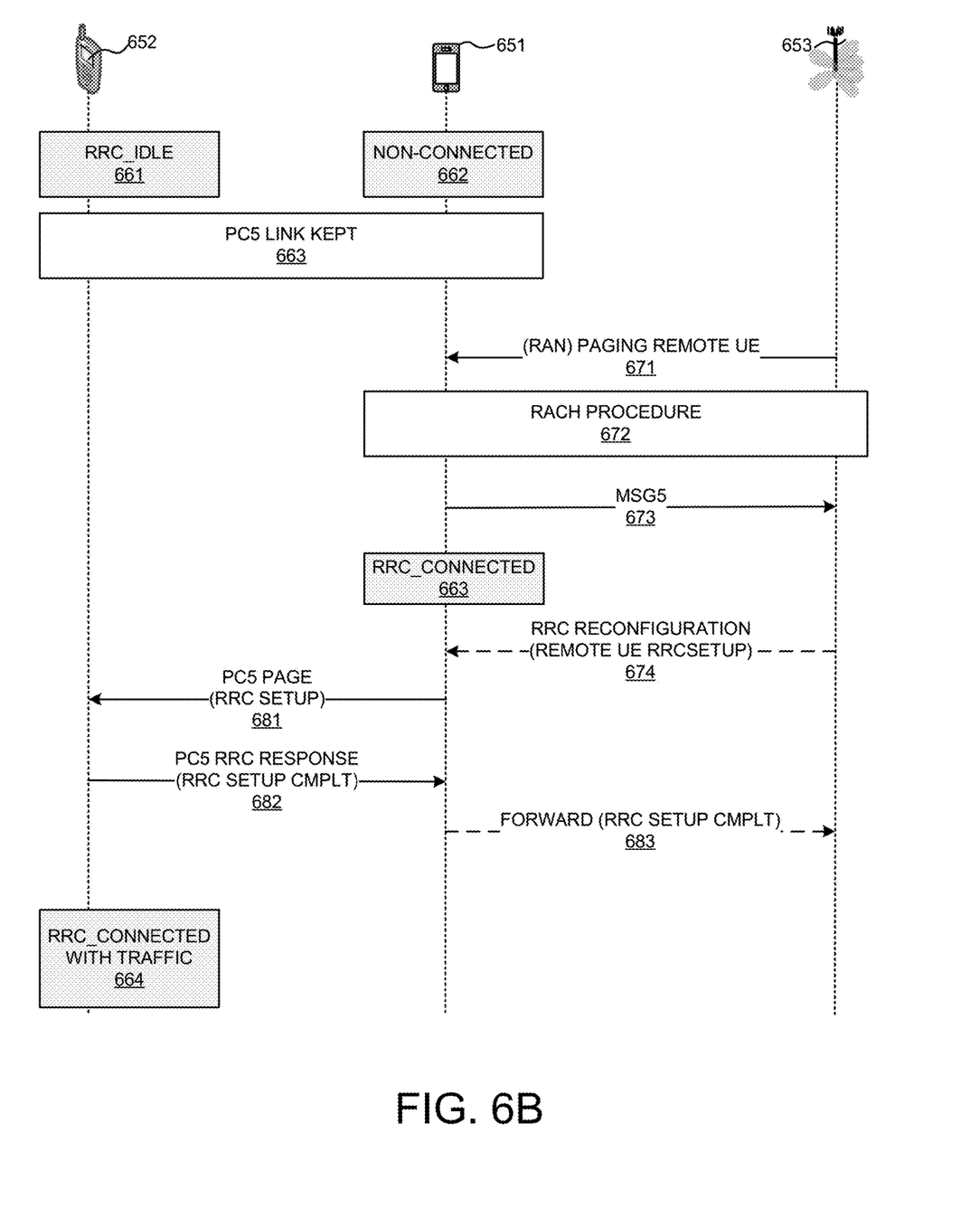
FIG. 6B illustrates an exemplary flow diagram of the relay UE forwarding paging messages from the network to the remote UE that is in RRC_IDLE state to wake up the remote UE in accordance with embodiments of the current invention.

FIG. 6B illustrates an exemplary flow diagram of the relay UE forwarding paging messages from the network to the remote UE that is in RRC_IDLE state to wake up the remote UE in accordance with embodiments of the current invention. Relay UE 651, in non-connected RRC state 662, establishes a sidelink (SL) with remote UE 652, which is in RRC_IDLE mode 661. Relay UE 651 is connected with a gNB/base station 653 through a Uu link in the wireless network. Remote UE 652 and relay UE 651 keeps the PC5 sidelink at 663. At step 671, gNB 653 initiates the paging message to the relay UE 651 with the intention to wake up both relay UE 651 and remote UE 652 for downlink data transmission to the remote UE 652. If relay UE 651 is in RRC_IDLE state, gNB 653 sends RAN paging message to wake up both remote UE 652 and relay UE 651. If relay UE 651 is in RRC_IDLE state, gNB 653 sends paging message to wake up both remote UE 652 and relay UE 651. In one embodiment, the remote UE index or identity is included in the paging message to allow relay UE 651 to identify which remote UE is the termination point for the downlink data transmission. In another embodiment, gNB 653 sends the remote UE index or identity in a dedicated RRC message to identify which remote UE is the termination point for the downlink data transmission.

At step 672, relay UE 601 performs RACH procedure towards gNB 653 as a response to the paging message from gNB 653. At step 673, message-5 is sent from relay UE 651 to gNB 653 to establish a RRC connection with the gNB 653. At step 663, relay UE 651 enters RRC_CONNECTED state. In one embodiment, at step 674, gNB 653 sends a RRC Reconfiguration message to the remote UE with RRCSetup. At step 681, relay UE 651 forwards a PC5 paging message to remote UE 652 based on paging message at step 671 and optionally RRCReconfiguration message at step 674. In one embodiment, PC5 paging message includes RRCSetup. At step 682, remote UE 652 responds PC5 RRC with an encapsulated Uu RRCSetupComplete message towards gNB 653. At step 683, the relay UE 651 forwards the encapsulated Uu RRCSetupComplete message towards gNB 653 over Uu. At step 664, remote UE 652 goes to RRC_CONNECTED state with traffic.

In one embodiment, relay UE 651 and remote UE 652 performs a handshake upon receiving the paging message at step 671. Upon successful handshake indicating that the remote UE is responsive, remote UE 652 initiates a RRC Setup Request message through the sidelink to relay UE 651. Relay UE 651 forwards the RRC Setup Request message through the Uu interface to gNB 653. In another embodiment, if the relay UE goes to RRC_IDLE, and the associated remote UE goes also to RRC_IDLE, gNB uses paging to wake up Relay UE before paging the remote UE for downlink data transmission. gNB knows the SL association between the relay UE and remote UE when they are both in RRC_IDLE. The SL association between the relay UE and remote UE when they are both in RRC_IDLE is stored by gNB. This SL association can be added into the UE context stored in gNB for UE in RRC_IDLE.

Figure 7:
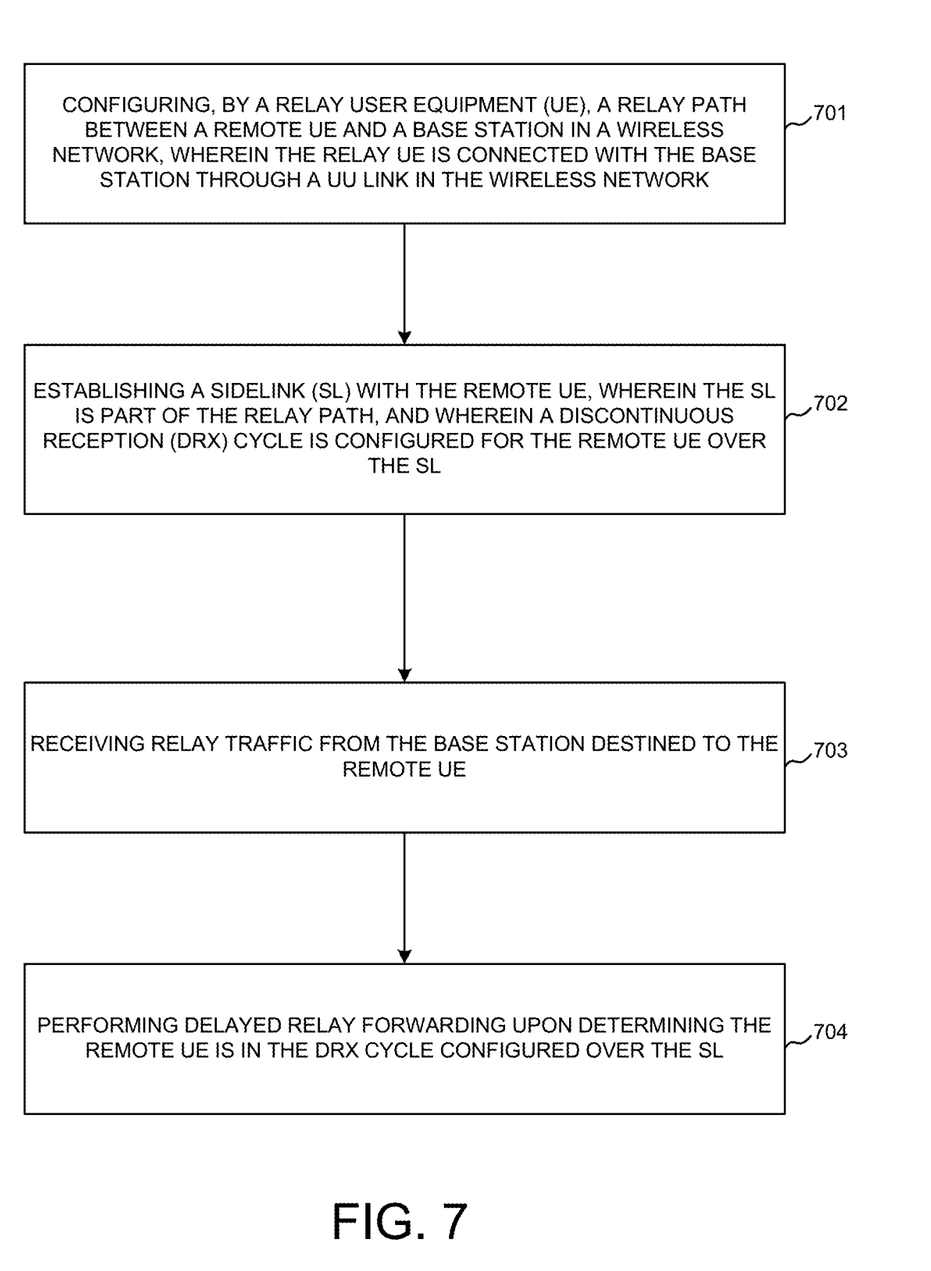
FIG. 7 illustrates an exemplary flow chart for the downlink data transmission through relay UE between remote UE in the long DRX state and base station in accordance with embodiments of the current invention.

FIG. 7 illustrates an exemplary flow chart for the downlink data transmission through relay UE between remote UE in the long DRX state and base station in accordance with embodiments of the current invention. At step 701, the relay UE configures a relay path between a remote UE and a base station in a wireless network, wherein the relay UE is connected with the base station through a Uu link in the wireless network. At step 702, the relay UE establishes a sidelink (SL) with the remote UE, wherein the SL is part of the relay path, and wherein a discontinuous reception (DRX) cycle is configured for the remote UE over the SL. At step 703, the relay UE receives relay traffic from the base station destined to the remote UE. At step 704, the relay UE performs delayed relay forwarding upon determining the remote UE is in the DRX cycle configured over the SL.

Figure 8:
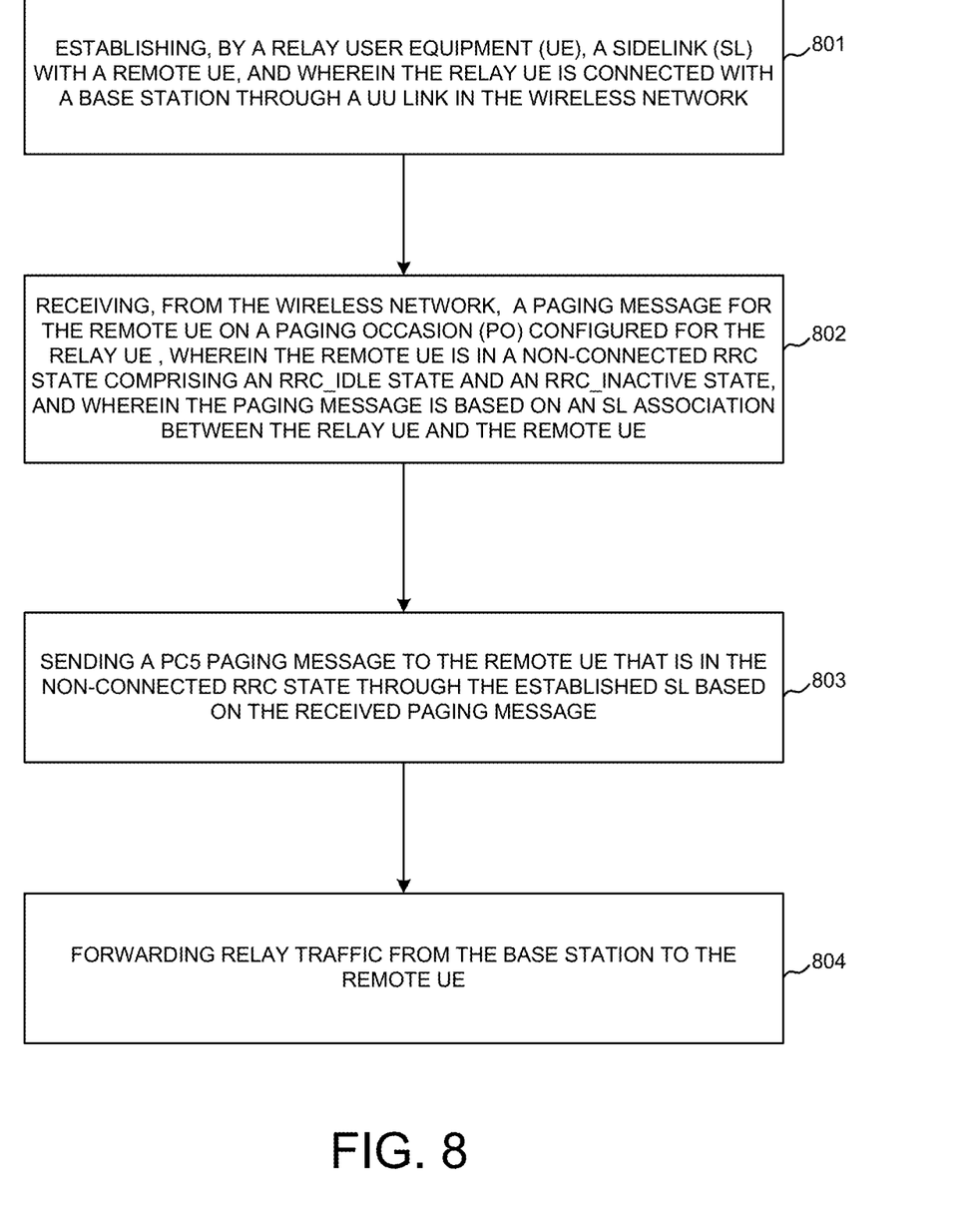
FIG. 8 illustrates and exemplary flow chart the relay UE forwarding paging messages from the network to the remote UE that is in one non-connected RRC state in accordance with embodiments of the current invention.

FIG. 8 illustrates and exemplary flow chart the relay UE forwarding paging messages from the network to the remote UE that is in one non-connected RRC state in accordance with embodiments of the current invention. At step 801, the relay UE establishes a sidelink (SL) with a remote UE, and wherein the relay UE is connected with a base station through a Uu link in the wireless network. At step 802, the relay UE receives, from the wireless network, a paging message for the remote UE on a paging occasion (PO) configured for the relay UE, wherein the remote UE is in a non-connected RRC state comprising an RRC_IDLE state and an RRC_INACTIVE state, and wherein the paging message is based on an SL association between the relay UE and the remote UE. At step 803, the relay UE sends a PC5 paging message to the remote UE that is in the non-connected RRC state through the established SL based on the received paging message. At step 804, the relay UE forwards relay traffic from the base station to the remote UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
configuring, by a relay user equipment (UE), a relay path between a remote UE and a base station in a wireless network, wherein the relay UE is connected with the base station through a Uu link in the wireless network;
establishing, by the relay UE, a sidelink (SL) with the remote UE, wherein the SL is part of the relay path, and wherein a discontinuous reception (DRX) cycle is configured for the remote UE over the SL;
receiving, by the relay UE, relay traffic from the base station destined to the remote UE, wherein the relay UE and the remote UE are in a radio resource control (RRC) connected state; and
performing, by the relay UE, delayed relay forwarding upon determining the remote UE is asleep in a mode of the DRX cycle in which the relay UE cannot deliver data to the remote UE, and wherein the DRX cycle is configured over the SL.

2. The method of claim 1, wherein the delayed relay forwarding performed by the relay UE comprises buffering the relay traffic at the relay UE.

3. The method of claim 2, further comprising: forwarding the buffered relay traffic and resuming relay traffic forwarding upon determining the remote UE exiting the DRX cycle.

4. The method of claim 1, performing the delayed relay forwarding comprises sending a suspending indication to the base station to request the base station to suspend the relay traffic to the remote UE.

5. The method of claim 4, further sending, by the relay UE, a resuming indication to the base station to request the base station to resume relay traffic to the remote UE upon determining the remote UE exiting the DRX cycle.

6. The method of claim 1, wherein the relay traffic is data traffic or a signaling message from the base station to the remote UE.

7. A user equipment (UE), comprising:
a transceiver that transmits and receives radio frequency (RF) signal in a wireless network;
a memory, and
a processor coupled to the memory, the processor configured to
configure a relay path between a remote UE and a base station, wherein the UE is connected with the base station through a Uu link in the wireless network;
establish an SL with the remote UE, wherein the SL is part of the relay path, and wherein a discontinuous reception (DRX) cycle is configured for the remote UE over the SL;
receive relay traffic from the base station destined to the remote UE, wherein the relay UE and the remote UE are in a radio resource control (RRC) connected state; and
perform delayed relay forwarding upon determining the remote UE is asleep in a mode of the DRX cycle in which the relay UE cannot deliver data to the remote UE, and wherein the DRX cycle is configured over the SL.

8. The UE of claim 7, wherein performing the delayed relay forwarding involves one or more procedures comprising buffering the relay traffic at the UE and sending a suspending indication to the base station to request the base station to suspend the relay traffic to the remote UE.

9. The UE of claim 7, wherein the relay traffic is data traffic or a signaling message from the base station to the remote UE.

* * * * *